US010906639B2

(12) United States Patent
Dunn et al.

(10) Patent No.: US 10,906,639 B2
(45) Date of Patent: Feb. 2, 2021

(54) BUSHING ALIGNMENT SYSTEM (71) Applicant: Lockheed Martin Corporation, Bethesda, MD (US)

(72) Inventors: Eric Dunn, Trumbull, CT (US); Frank M. Caputo, Cheshire, CT (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 150 days.

(21) Appl. No.: 16/058,061

(22) Filed: Aug. 8, 2018

(65) Prior Publication Data
US 2020/0047880 A1 Feb. 13, 2020

(51) Int. Cl.
B64C 27/48 (2006.01)
B64C 27/33 (2006.01)
F16B 43/00 (2006.01)
F16C 35/02 (2006.01)

(52) U.S. Cl.
CPC .............. B64C 27/48 (2013.01); B64C 27/33 (2013.01); F16B 43/00 (2013.01); F16C 35/02 (2013.01); F16C 2226/60 (2013.01); F16C 2326/43 (2013.01)

(58) Field of Classification Search
CPC ......... B64C 27/48; B64C 27/54; B64C 27/32; F16B 19/02; F16B 43/00; F16C 23/10; F16C 35/02; F16C 2226/60
See application file for complete search history.

(56) References Cited

U.S. PATENT DOCUMENTS

| 3,956,803 | A | * | 5/1976 | Leitner | F16B 19/02 411/349 |
| 4,309,123 | A | * | 1/1982 | Moore | B25B 15/02 29/240 |
| 4,828,458 | A | * | 5/1989 | Pariani | B64C 27/33 416/123 |
| 6,647,869 | B2 | | 11/2003 | Bornhorst et al. | |
| 6,997,658 | B2 | * | 2/2006 | Fly | B25B 5/08 24/458 |
| 8,500,407 | B1 | * | 8/2013 | Kennedy | B64C 27/48 416/209 |
| 9,415,859 | B2 | | 8/2016 | Okabe et al. | |
| 9,573,198 | B1 | | 2/2017 | Favilla et al. | |
| 9,981,352 | B2 | * | 5/2018 | Bargiacchi | B25B 27/06 |
| 10,214,284 | B2 | * | 2/2019 | Hunter | F16F 1/393 |
| 2002/0133950 | A1 | * | 9/2002 | Bullard | B23P 19/10 29/898.07 |
| 2017/0045080 | A1 | | 2/2017 | Grether et al. | |
| 2017/0114880 | A1 | | 4/2017 | Favilla et al. | |
| 2019/0093697 | A1 | * | 3/2019 | Becker | F16B 5/0258 |

* cited by examiner

Primary Examiner — Nathaniel E Wiehe
Assistant Examiner — Jackson N Gillenwaters
(74) Attorney, Agent, or Firm — Foley & Lardner LLP (57) ABSTRACT A bushing assembly for receiving a fastener includes a first bushing portion and a second bushing portion arranged coaxially with the first bushing portion. The second bushing portion defines at least part of an opening for receiving the fastener. The second bushing portion is rotatable relative to the first bushing portion about an axis of rotation to adjust a position of the opening about a first axis and a second axis independently relative to the first bushing portion and the second bushing portion. The first axis is coplanar with and perpendicular to the second axis.

13 Claims, 8 Drawing Sheets

BUSHING ALIGNMENT SYSTEM

BACKGROUND

Embodiments disclosed herein relate generally to a bushing assembly, and more particularly, to a bushing assembly for use in a rotor of a rotary wing aircraft.

In typical flexbeam helicopter rotors, a flexbeam extends from a rotor hub and is connected to a torque tube and blade via a bolted joint and a snubber type bearing at an inboard end of the torque tube located between the flexbeam and the torque tube. The snubber bearing positions the torque tube relative to the flexbeam for pitch change and flapping motion of the torque tube and react shear loads on the assembly.

Components of the rotor system, such as the torque tube and/or snubber bearing, may be formed with large tolerances to reduce the cost of manufacture. Due to the potential for large tolerance stack ups, loose fitting or oversized attachment holes may be formed to ensure alignment between adjacent components. However, formation of oversized attachment holes may allow for relative movement between components. An adjustable but rigid interface at these holes is required to translate bearing loads between components and prevent undesirable relative movement. Use of a single eccentric bushing does not provide for independent bi-directional adjustment. While the use of two separate eccentric bushings allows for independent adjustment in two directions, such an assembly results in an increase in both complexity and cost.

BRIEF DESCRIPTION

According to an embodiment, a bushing assembly for receiving a fastener includes a first bushing portion and a second bushing portion arranged coaxially with the first bushing portion. The second bushing portion defines at least part of an opening for receiving the fastener. The first and second bushing portions are rotatable relative to the opening which accepts the bushing assembly about an axis of rotation to adjust a position of the opening about a first axis and a second axis independently relative to the first bushing portion and the second bushing portion. The first axis is coplanar with and perpendicular to the second axis.

In addition to one or more of the features described above, or as an alternative, in further embodiments an inner diameter of the first bushing portion is substantially equal to an outer diameter of the second bushing portion.

In addition to one or more of the features described above, or as an alternative, in further embodiments the second bushing portion is nestable within the first bushing portion.

In addition to one or more of the features described above, or as an alternative, in further embodiments at least one of the first bushing portion and the second bushing portion is crescent shaped.

In addition to one or more of the features described above, or as an alternative, in further embodiments at least one of the first bushing portion and the second bushing portion has a first thickness at a first end and a second end, and a second thickness at a central portion disposed between the first end and the second end.

In addition to one or more of the features described above, or as an alternative, in further embodiments the first thickness is a minimum thickness and the second thickness is a maximum thickness greater than the first thickness.

In addition to one or more of the features described above, or as an alternative, in further embodiments the first bushing portion and the second bushing portion are substantially identical.

In addition to one or more of the features described above, or as an alternative, in further embodiments the first bushing portion has a first opening formed therein, the first opening being offset from the axis of rotation.

In addition to one or more of the features described above, or as an alternative, in further embodiments the second bushing portion is received within the first opening, the second bushing having a second opening formed therein, the second opening being offset from the axis of rotation.

In addition to one or more of the features described above, or as an alternative, in further embodiments comprising an indexing hole formed in at least one of the first bushing portion and the second bushing portion.

In addition to one or more of the features described above, or as an alternative, in further embodiments the first bushing portion includes a first feature and the second bushing portion includes a second feature corresponding to the first feature, wherein engagement of the first feature and the second feature restricts movement of the second bushing portion out of a plane of the first bushing portion.

According to another embodiment, an assembly includes a first component having a first opening and a second component having a second opening. The first opening and the second opening are configured to accept a common fastener. The assembly additionally includes a fastener and a bushing assembly. The bushing assembly includes a first bushing portion and a second bushing portion arranged coaxially with the first bushing portion. At least one of the first bushing portion and the second bushing portion defines an opening which receives the fastener. The first and second bushing portion are rotatable about an axis of rotation to adjust a position of the opening about a first axis and a second axis independently relative to the first bushing portion and the second bushing portion to align the fastener with the second opening.

In addition to one or more of the features described above, or as an alternative, in further embodiments the assembly is a rotor blade assembly.

In addition to one or more of the features described above, or as an alternative, in further embodiments the first component is a torque tube and the second component is a pitch bearing assembly.

In addition to one or more of the features described above, or as an alternative, in further embodiments the first bushing portion is nestable within the second bushing portion.

In addition to one or more of the features described above, or as an alternative, in further embodiments the first bushing portion is nested within the second bushing portion.

According to yet another embodiment, a method of adjusting a position of an opening defined by a bushing assembly including a first bushing portion and a second bushing portion, includes adjusting a position of the opening defined by at least one of the first bushing portion and the second bushing portion about a first axis and a second axis independently by rotating the first and second bushing portion relative to the opening which accepts the bushing assembly about an axis of rotation and inserting a fastener into the opening with the adjusted position.

In addition to one or more of the features described above, or as an alternative, in further embodiments adjusting the opening includes aligning the opening with a corresponding first opening formed in an adjacent first component.

In addition to one or more of the features described above, or as an alternative, in further embodiments adjusting the opening includes aligning the opening with a corresponding second opening formed in an adjacent second component.

In addition to one or more of the features described above, or as an alternative, in further embodiments rotating the second bushing portion relative to the first bushing portion occurs via a tool inserted into an indexing hole in the second bushing portion.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
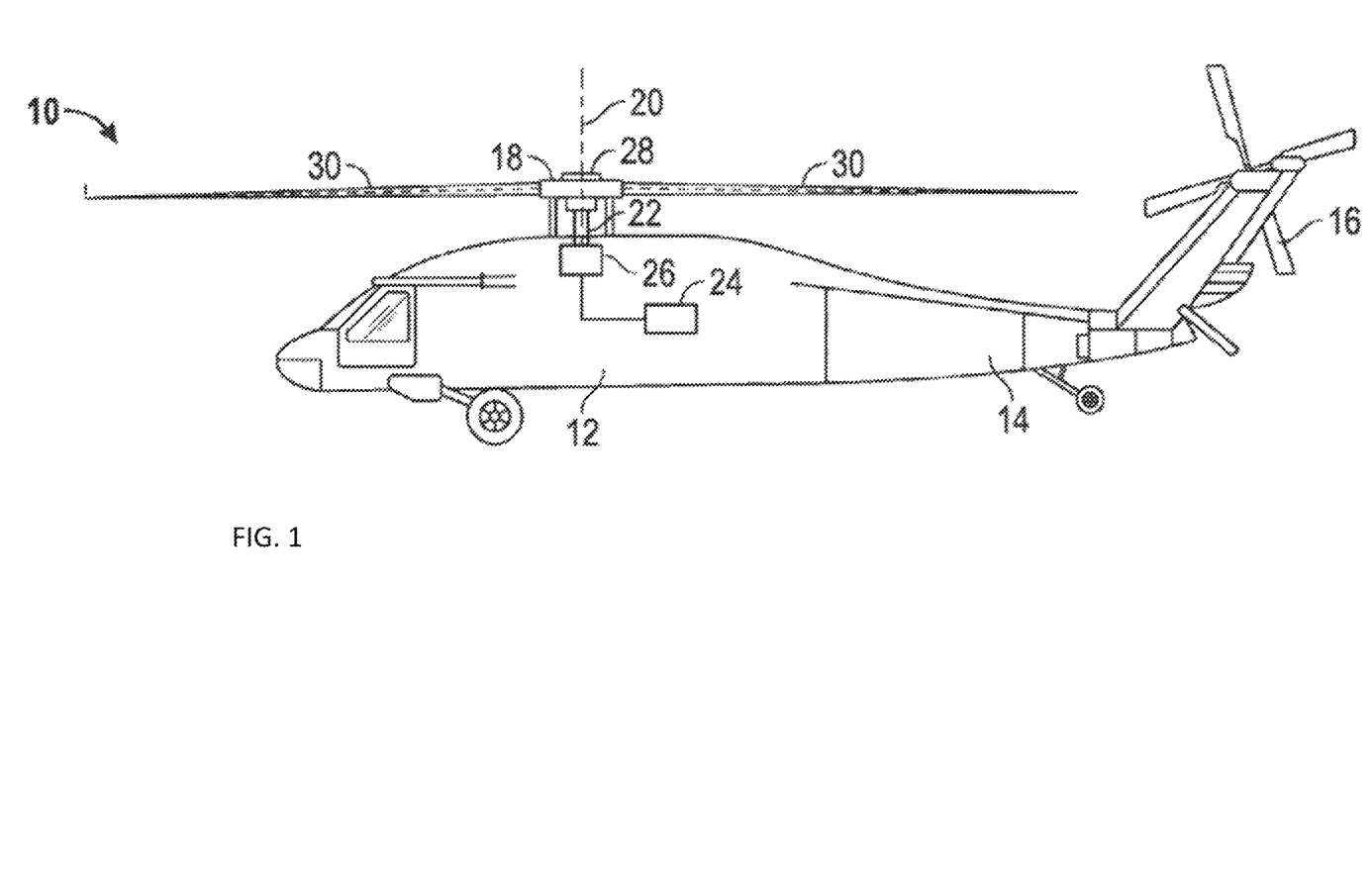
FIG. 1 is a schematic view of an example of a rotary wing aircraft.

FIG. 1 schematically illustrates a rotary-wing aircraft 10, such as a helicopter for example. The aircraft 10 includes an airframe 12 having an extending tail 14 which mounts a tail rotor system 16, such as an anti-torque system for example. A main rotor assembly 18 is driven about an axis of rotation 20. In an embodiment, a drive shaft 22 operably couples the main rotor assembly to a power source, such as an engine (illustrated schematically at 24) for example, through a main gearbox (illustrated schematically at 26). The main rotor system 18 includes a plurality of rotor blades 30 mounted to a rotor hub 28. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, multirotor, turboprops, tilt-rotors, and tilt-wing aircraft, will also benefit from the present invention.

Figure 2:
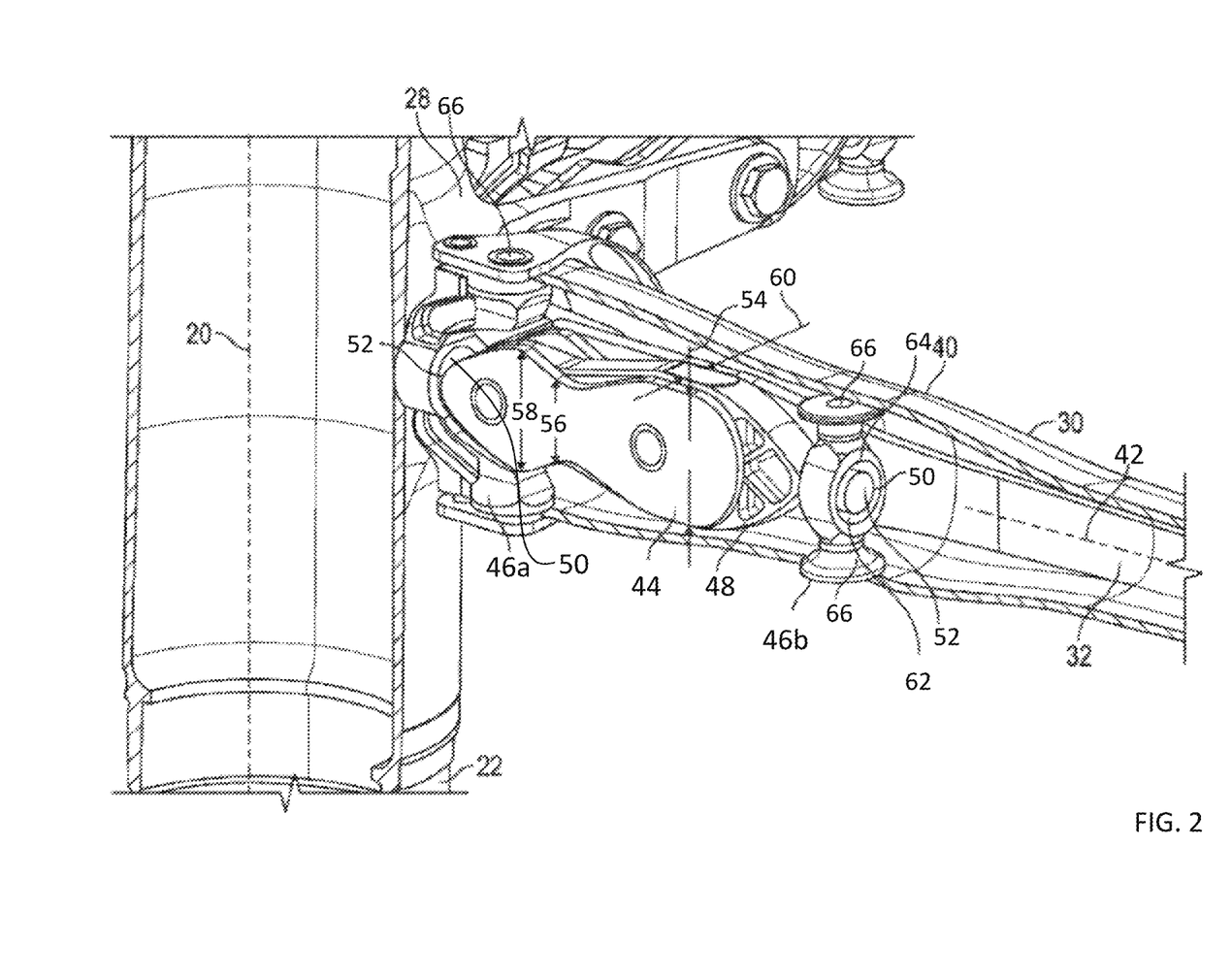
FIG. 2 is a cross-sectional view of an embodiment of a rotor hub and blade assembly.

With reference now to FIG. 2, an example of the main rotor assembly 18 is illustrated in more detail. As shown, each blade assembly 30 includes at least one flex-beam member 32 secured to the rotor hub 28 and extending radially outwardly therefrom. A torque tube 40 is positioned around the flex-beam member 32. A rotor blade (not shown) having an airfoil-shaped cross-section is secured to the torque tube 40 and the flex-beam member 32 to extend radially outwardly along a blade axis 42. In some embodiments, the torque tube 40 and the rotor blade are assembly into a unitary assembly prior to installation about the flex beam member 32. The inboard end of the torque tube 40 is positioned and supported relative to the flex beam member 32 by a pitch bearing assembly 44.

In the illustrated, non-limiting embodiment, the pitch bearing assembly 44 includes an inboard bearing outer member 46a and an outboard bearing outer member 46b positioned within and secured to the torque tube 40. A bearing inner member 48 extends between the two bearing outer members 46a, 46b into bearing races 50 of the bearing outer members 46a, 46b and is secured to the flex beam member 32 and rotor hub 28 at one or more locations. In an embodiment, the bearing inner member 48 includes interface portions 52, which may be cylindrical and extend into the bearing races 50 of each of the bearing outer members 46a, 46b.

The height of the bearing inner member 48 may vary over the spanwise length of the bearing inner member 48. In the illustrated, non-limiting embodiment, inboard of the outboard bearing outer member 46b, a height of the bearing inner member 48 measured parallel to the main rotor axis 20 increases to a first peak, illustrated at 54. Continuing inboard, the height may lessen to a valley, illustrated at 56, and then increases again to a second peak, illustrated at 58. Further, the bearing inner member 48 has a lateral thickness 60 which may be constant along a spanwise length of the bearing inner member 48, or which may vary. It should be understood that the shape of the bearing inner member 48 illustrated and described herein is intended as an example only and that a bearing inner member 48 having another shape or configuration is also within the scope of the disclosure.

The bearing inner member 48 and the bearing outer members 46a, 46b are typically metallic elements, such as formed from a titanium, steel, or aluminum material for example. In other embodiments, at least one of the bearing inner member 48 and the bearing outer members 46a, 46b may be formed from a composite material. One or more bearing elements 62 may be located between the bearing inner member 48 and the bearing outer member 46a, 46b, at an interface portion 52 where the bearing inner member 48 extends into a bearing outer member opening 64. The bearing elements 62 may be elastomeric bearing elements formed from an elastic material, such as rubber or any other polymeric material for example, or alternatively, from a nonpolymer elastic material, of from a combination of polymer and nonpolymer materials. In other embodiments, the bearing elements 62 are roller or needle elements made of steel or ceramic and are configured to move in a circular pattern between the bearing inner member 48 and the bearing outer member 46a, 46b at the interface portion 52.

Figure 3:
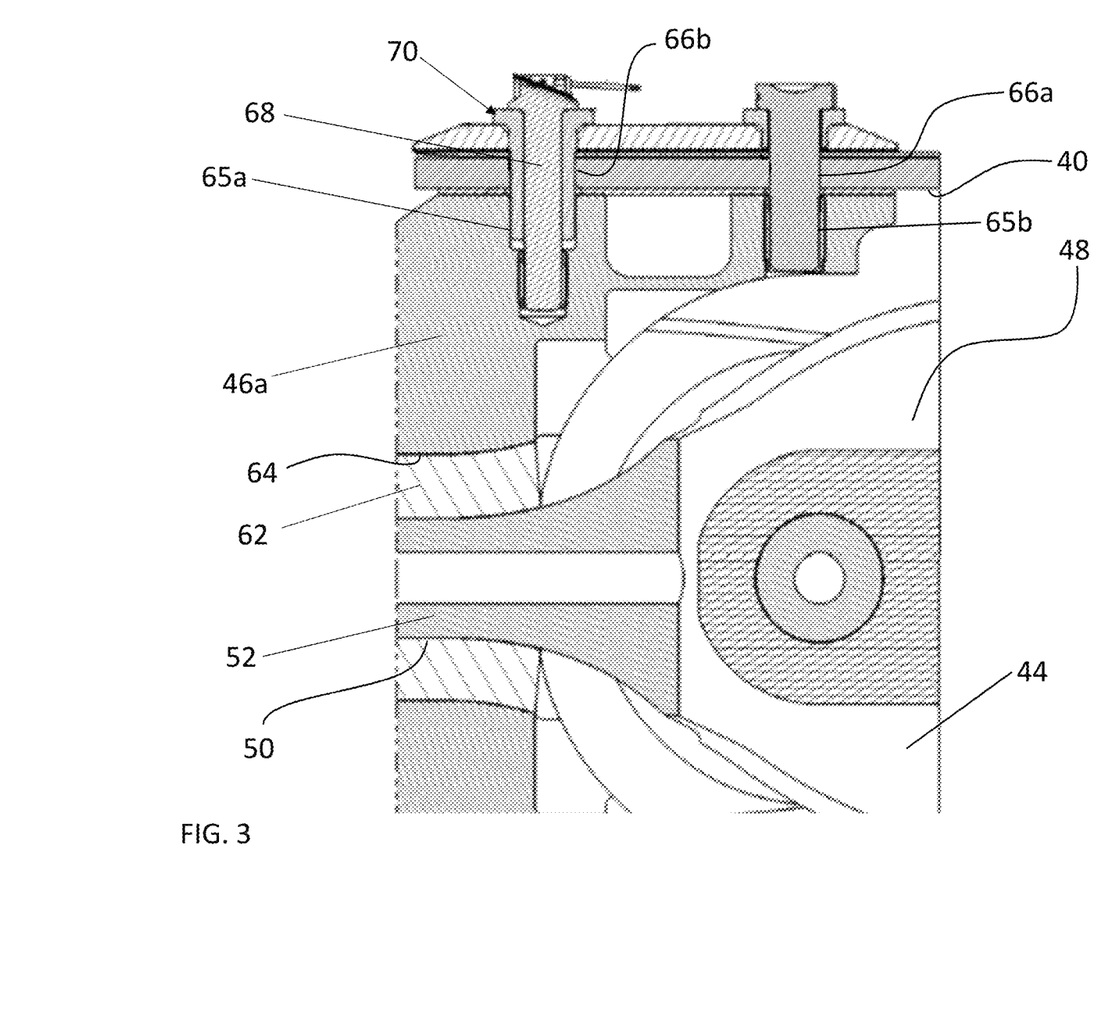
FIG. 3 is a detailed view of a portion of the rotor hub and blade assembly of FIG. 2 according to an embodiment.

With reference to FIG. 3, the bearing outer members 46a, 46b are typically secured to the torque tube 40 via one or more fasteners 68 installed in one or more openings 66. However, it should be appreciated that the bearing outer members 46a, 46b may be secured to the torque tube 40 by other mechanisms and systems. It should be understood that a pitch bearing assembly 44 having another shape or configuration is also within the scope of the disclosure.

Due to tolerance stack up that can result between the position of the openings 65a, 65b formed in the pitch bearing assembly 44 and the position of the corresponding openings 66a, 66b formed in the torque tube 40, the diameter of the openings 66a, 66b formed in the torque tube 40 are typically oversized with respect to the connecting fasteners 68. With continued reference to FIG. 3 and further reference to FIGS. 4-7, a bushing assembly 70 is disposed within one or more of the aligned openings 66a, 66b used to couple the bearing outer members 46a, 46b of the pitch bearing assembly 44 to the torque tube 40. X is the axis of the diameter of the openings 66a and 66b. As shown, the bushing assembly 70 typically includes a first bushing portion 72 and a second bushing portion 74. The first and second bushing portions 72, 74 are arranged such that the inner diameter of the first bushing portion 72 and the outer diameter of the second bushing portion 74 are coaxial and at least one of the first bushing portion 72 and the second bushing portion 74 is rotatable about the axis X and inner diameter of the first bushing portion 72. Further, the second bushing portion 74 is configured to nest within the inner diameter of the first bushing portion 72 as the outer diameter of the second bushing portion 74 is rotated about the axis of the inner diameter of the first bushing portion 72. Accordingly, an inner diameter of the first bushing portion 72 is substantially equal to an outer diameter of the second bushing portion 74.

Figure 4A:
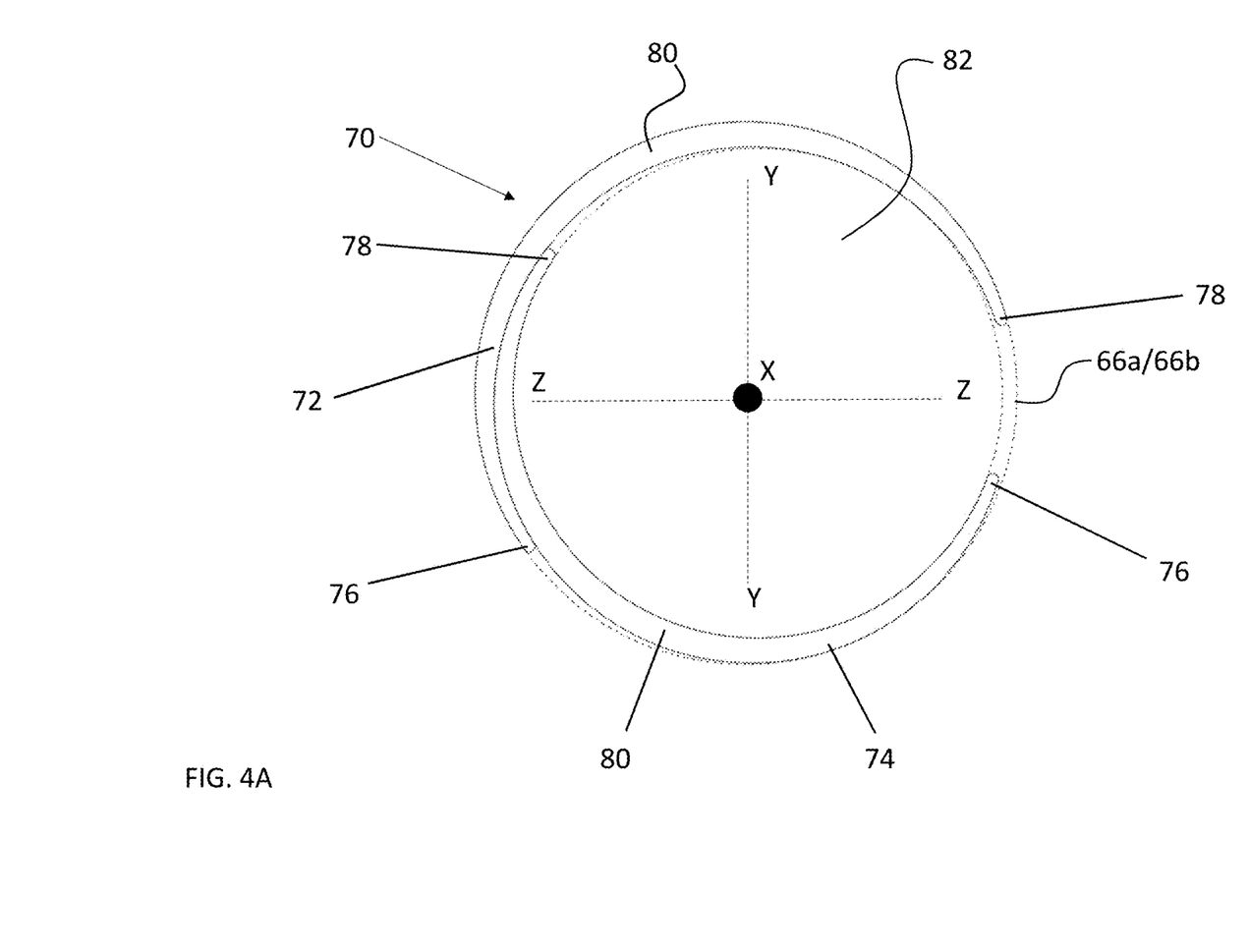
FIGS. 4A-4C are various plan views of a bushing assembly according to an embodiment.
Figure 4B:
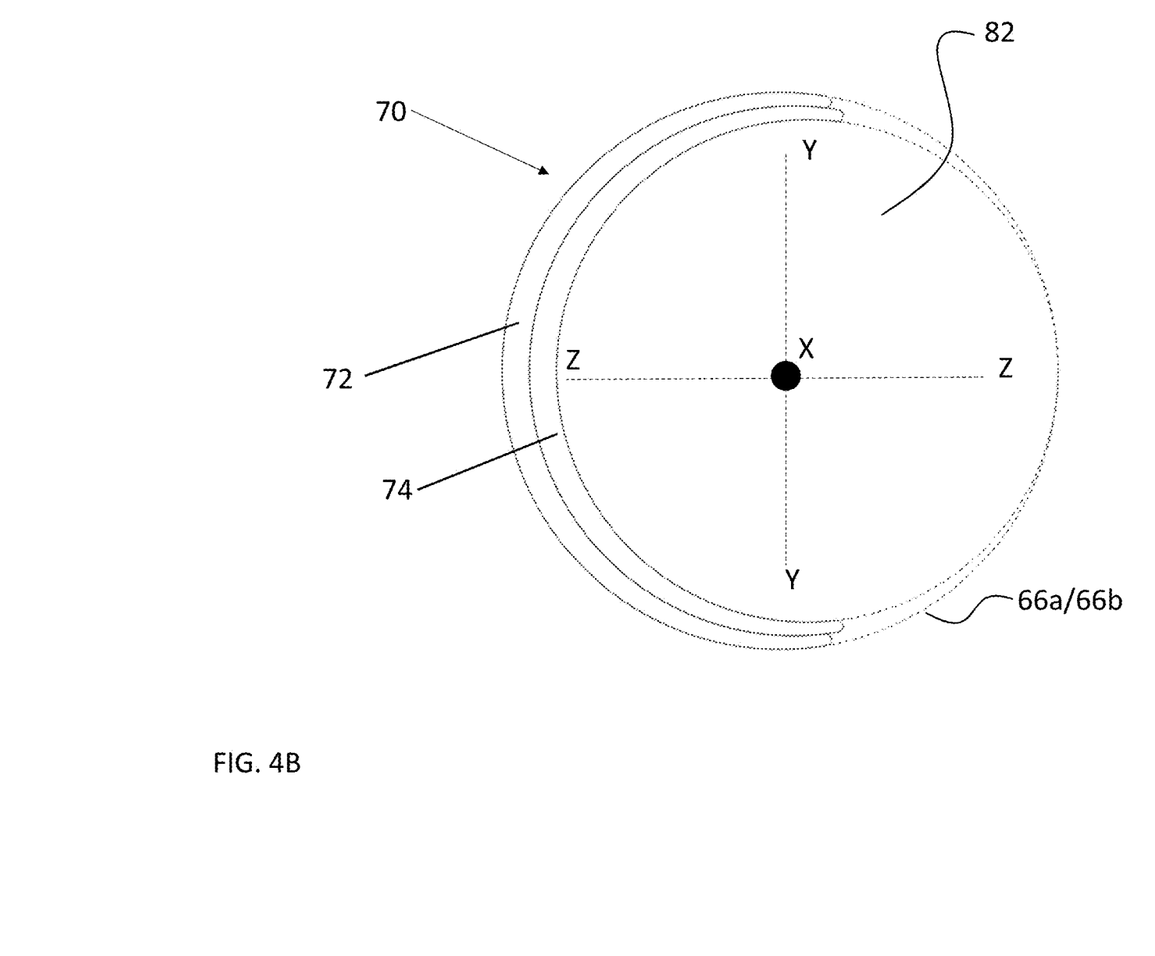
Figure 4C:
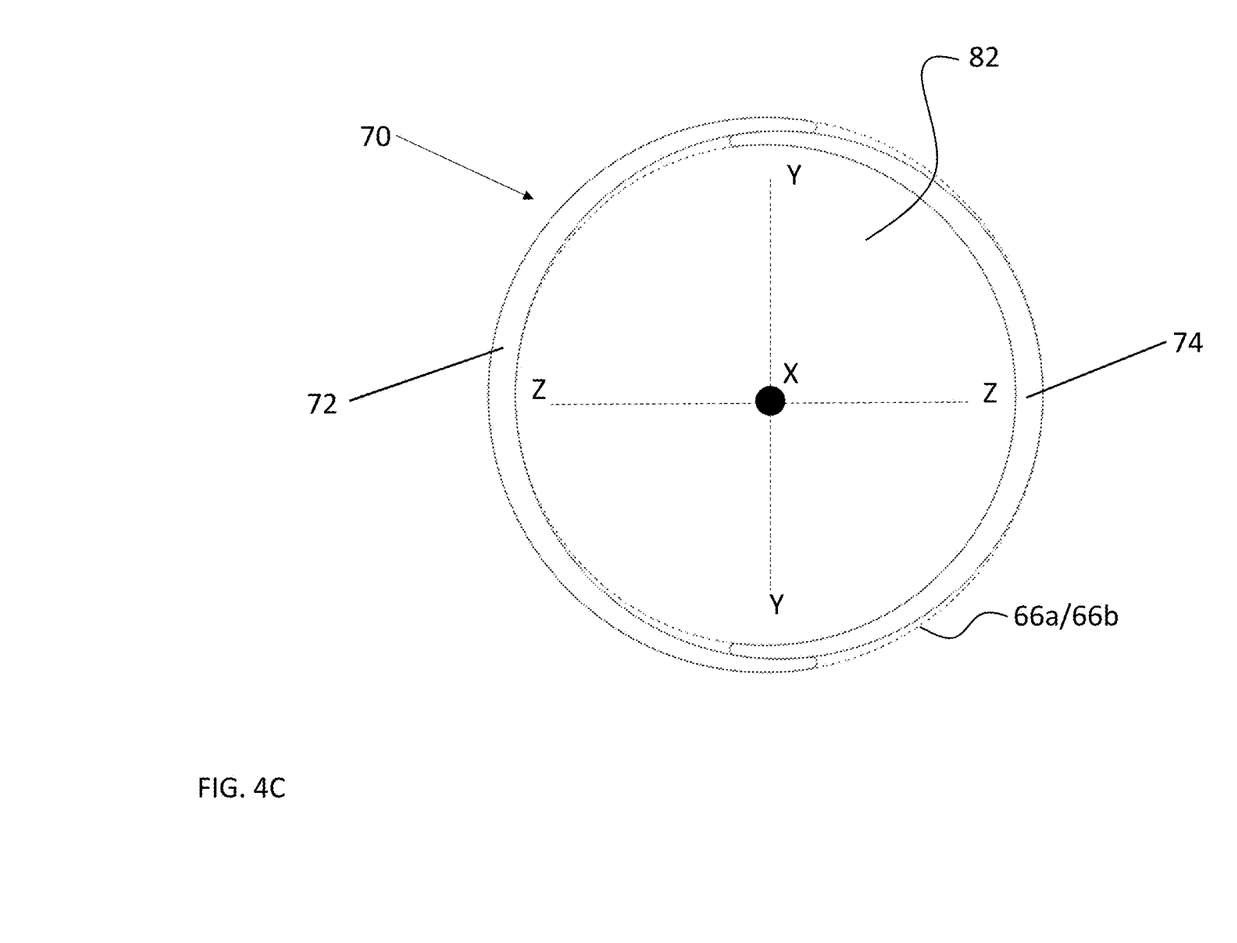

In the non-limiting embodiment shown in FIGS. 4A-4C, the inner diameter of first bushing portion 72, and the outer diameter of the second bushing portion 74 are cylindrical or constant along the X axis direction. However, embodiments where these diameters are spherical about a common point, allowing for angular misalignment between the fasteners and opening, is also contemplated herein.

In the non-limiting embodiment illustrated in FIGS. 4A-4C, the first bushing portion 72 and the second bushing portion 74 are similar in shape. As shown, each of the first bushing portion 72 and the second bushing portion 74 is generally crescent shaped or C-shaped. In an embodiment, both the first and second bushing portions 72, 74 have a first thickness at both a first and second ends 76, 78 thereof, and a second, maximum thickness at a central portion 80 disposed midway between the first and second ends 76, 78. The thickness of the bushing portions 72, 74 gradually increases from the first end 76 and the second end 78 towards the central portion 80. In an embodiment, the thickness at the first end 76 and second end 78 of the first bushing portion 72 is substantially identical to the thickness at the first end 76 and second end 78 of the second bushing portion 74. Similarly, the maximum thickness at the central portion 80 of the first bushing portion 72 is the same as the maximum thickness at the central portion 80 of the second bushing portion 74. However, embodiments where the thickness of at least one of the first end 76, second end 78, and central portion 80 of the first and second bushing portions 72, 74 is not equal are also contemplated herein. Additionally embodiments where the outer diameter of the first bushing portion 72 is not cylindrical, such as a conic or any surface of revolution, in order to custom match the geometry of opening 66a and 66b, are also contemplated herein.

An opening 82 within which a fastener 68 is received, is defined by the inner surface of at least one of the first and second bushing portion 72, 74, and in some embodiments, by a sidewall of the openings 66a, 66b formed in the corresponding components 44, 40 40 depending on the relative rotation of the first and second bushing portions 72, 74. Accordingly, rotation of the second bushing portion 74 relative to the first bushing portion 72 about the inner diameter of the first bushing portion 72 may be used to adjust the position of the opening 82 about both a first axis Y and a second, perpendicular axis Z, thereby aligning the fastener 68 to the opening 66a. Additionally, rotation of the first bushing portion 72 relative to the second bushing portion 74 about axis X may be used to adjust the position of the opening 82 about both the first axis Y and the second axis Z, thereby aligning the fastener 68 to the opening 66a. In an embodiment, the position of the opening 82 may be adjusted relative to the Y axis and the Z axis independently by rotating both bushing portions 72, 74, thereby aligning the fastener 68 to the opening 66a. For example, when the first and second bushing portion 72, 74 are disposed opposite and facing one another, as shown in FIG. 4C, the opening 82 is centered about the Y and Z axes, between the first and second bushing portion 72, 74. Alternatively, when the first and second bushing portion 72, 74 are nested and aligned, as shown in FIG. 4B, the opening 82 is shifted as far as possible to a side away from the central axis X. This allows the full amount of hole to fastener misalignment which would be allowed in the absence of any bushing. Further, any intermediate rotated position of second bushing portion 74 relative to the first bushing portion 72 may be used to achieve any desired position of the opening 82 between these centered position and the outer extremes in any direction of the YZ plane.

Figure 5:
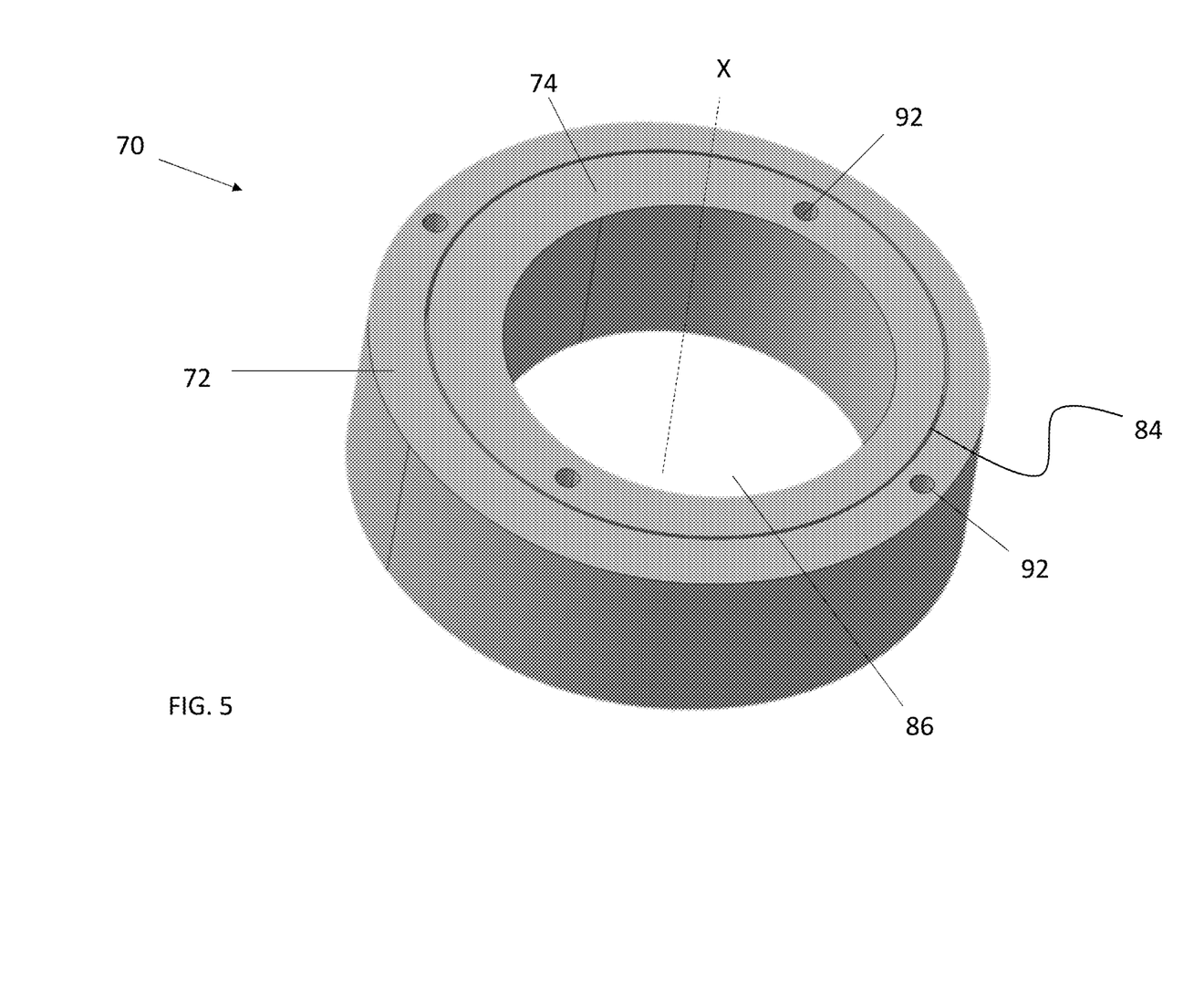
FIG. 5 is a perspective view of another bushing assembly according to an embodiment.
Figure 6:
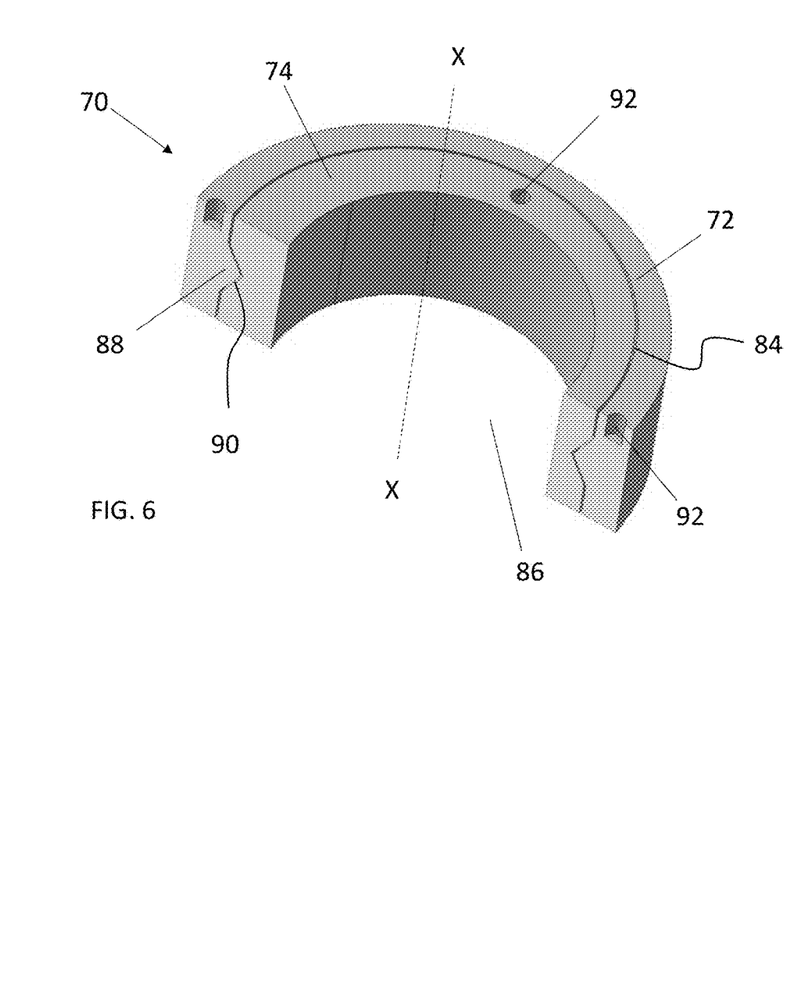
FIG. 6 is a cross-sectional view of the bushing assembly of FIG. 5 according to an embodiment.
Figure 7:
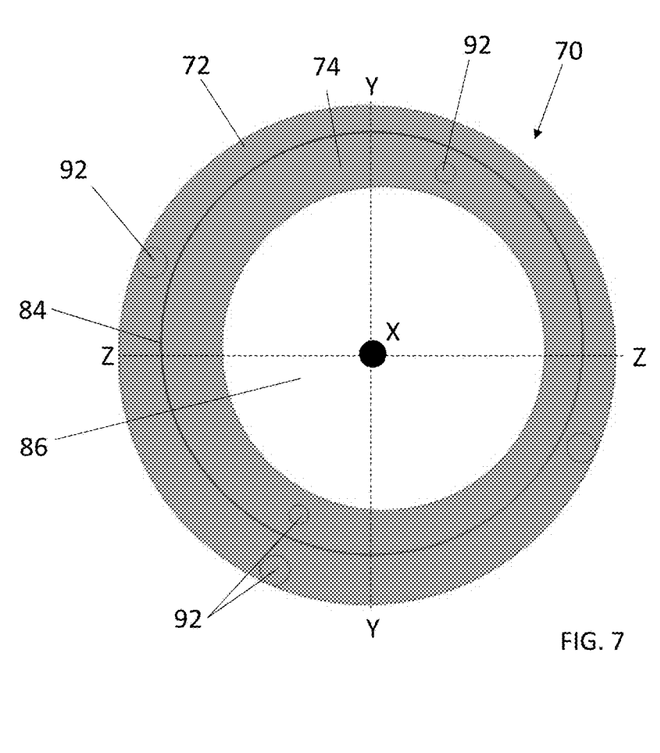
FIG. 7 is a plan view of the bushing assembly of FIG. 5 according to an embodiment.

Another embodiment of the bushing assembly 70 is illustrated in FIGS. 5-7. As previously described, the bushing assembly 70 includes a coaxially located first bushing portion 72 and second bushing portion 74. The first bushing portion 72 is generally cylindrical in shape and has an opening 84 formed therein. The opening 84 is generally skewed relative to the central axis X such that a wall thickness of the first bushing portion 72 defined by the opening 84 is eccentric about the axis X. The second bushing portion 74 is nested radially within the opening 84 of the first bushing portion 72. Accordingly, an outer diameter of the second bushing portion 74 is generally equal to the inner diameter of the first bushing portion 72. The second bushing portion 74 is also generally cylindrical in shape and has an opening 86 formed therein.

A length of the first bushing portion 72 and the second bushing portion 74, measured parallel to the axis of rotation X, may, but need not be substantially identical. In an embodiment, best shown in FIG. 6, a first feature 88 is formed about the inner periphery of the first bushing portion 72, and extends radially inwardly therefrom. A corresponding groove or second feature 90 is formed about an outer periphery of the second bushing portion 74 and is configured to receive or engage the first feature 88 to restrict movement of the second bushing portion 74 along the X axis relative to the first bushing portion 72. In such embodiments, the first and second bushing portions may be formed simultaneously, such as via an additive manufacturing process for example, and may include accommodations for the specific method of additive manufacturing, such as sloped overhangs to eliminate the need for support material. Alternately, the first, second or both bushing portions 72, 74 may be assembled from multiple pieces to allow the formation of the captivated nested bushing assembly.

The opening 86 formed in the second bushing portion 74 is configured to receive a fastener 68. As shown, the opening 86 formed in the second bushing portion 74 is offset from the axis of the outer diameter of the second hushing portion 74 such that a wall thickness of the second bushing portion 74 defined by the opening 86. The minimum wall thickness and maximum wall thickness of the first bushing portion 72 and the second bushing portion 74 may be the same, or alternatively, may be different. The second bushing portion 74 is rotatable about the axis of the inner diameter of the first bushing relative to the first bushing portion 72. Alternatively, or in addition, the first bushing portion 72 is rotatable about the axis X relative to the second bushing portion 74. In an embodiment, one or more indexing holes 92 may be formed in an upper surface of the first bushing portion and/or the second bushing portion 74. These indexing holes 92 may be sized to receive a corresponding tool to facilitate rotation of the first and/or second bushing portion 72, 74 about axis X. Due to the eccentricity of both the first and second bushing portions 72, 74 the relative rotation between the first bushing portion 72 to adjust the position of the opening 86 about both a first axis Y and a second, perpendicular axis Z.

Inclusion of an eccentric bushing assembly 70 as illustrated and described herein allows for a wide range of misalignment between openings formed in two connecting components, while eliminating the complexity of a non-nested dual bushing. Further, various materials having different characteristics, such as toughness and hardness for example, may be customized for each application.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bushing assembly for receiving a fastener, the assembly comprising:
    a first bushing portion;
    a second bushing portion arranged coaxially with the first bushing portion, the second bushing portion defining at least part of an opening for receiving the fastener, wherein the second bushing portion is rotatable relative to the first bushing portion about an axis of rotation between a plurality of configurations to adjust a position of the opening about a first axis and a second axis independently relative to the first bushing portion and the second bushing portion, the first axis being coplanar with and perpendicular to the second axis, wherein in a first configuration of the plurality of configurations, the opening for receiving the fastener is defined between an interior surface of the first bushing portion and an interior surface of the second bushing portion, and in a second configuration of the plurality of configurations, at least a part of the first bushing portion overlaps the second bushing portion, at least one of the first bushing portion or the second bushing portion being crescent shaped.

2. The bushing assembly of claim 1, wherein an inner diameter of the first bushing portion is substantially equal to an outer diameter of the second bushing portion.

3. The bushing assembly of claim 1, wherein the second bushing portion is nestable within the first bushing portion.

4. The bushing assembly of claim 1, wherein at least one of the first bushing portion or the second bushing portion has a first thickness at a first end and a second end, and a second thickness at a central portion disposed between the first end and the second end.

5. The bushing assembly of claim 4, wherein the first thickness is a minimum thickness and the second thickness is a maximum thickness greater than the first thickness.

6. The bushing assembly of claim 1, wherein the first bushing portion and the second bushing portion are identical.

7. An assembly comprising:
    a first component having a first opening;
    a second component having a second opening, the second opening being at least partially aligned with the first opening;
    a fastener; and
    a bushing assembly received within the first opening and the second opening, the bushing assembly comprising:
        a first bushing portion;
        a second bushing portion arranged coaxially with the first bushing portion, wherein at least one of the first bushing portion or the second bushing portion defines an opening which receives the fastener, the second bushing portion being rotatable about an axis of rotation between a plurality of configurations to adjust a position of the opening about a first axis and a second axis independently relative to the first bushing portion and the second bushing portion to align the fastener with the second opening,
    wherein in a first configuration of the plurality of configurations, the opening for receiving the fastener is defined between an interior surface of the first bushing portion and an interior surface of the second bushing portion, and in a second configuration of the plurality of configurations, at least a part of the first bushing portion overlaps the second bushing portion, at least one of the first bushing portion or the second bushing portion being crescent shaped.

8. The assembly of claim 7, wherein the assembly is a rotor blade assembly.

9. The assembly of claim 8, wherein the first component is a torque tube and the second component is a pitch bearing assembly.

10. The assembly of claim 7, wherein the first bushing portion is nestable within the second bushing portion.

11. A method of adjusting a position of an opening defined by a bushing assembly including a first bushing portion and a second bushing portion, the method comprising:
    adjusting a position of the opening defined by at least one of the first bushing portion or the second bushing portion about a first axis and a second axis independently by rotating the second bushing portion relative to the first bushing portion about an axis of rotation, wherein the second bushing portion is rotatable between a plurality of configurations and in a first configuration of the plurality of configurations, the opening for receiving the fastener is defined between an interior surface of the first bushing portion and an interior surface of the second bushing portion, and in a second configuration of the plurality of configurations, at least a part of the first bushing portion overlaps the second bushing portion, at least one of the first bushing portion or the second bushing portion being crescent shaped; and inserting a fastener into the opening with the adjusted position.

12. The method of claim 11, wherein adjusting the opening includes aligning the opening with a corresponding first opening formed in an adjacent first component.

13. The method of claim 11, wherein adjusting the opening includes aligning the opening with a corresponding second opening formed in an adjacent second component.

* * * * *